UNITED STATES PATENT OFFICE.

JOSEPH ANNAHEIM, OF BASLE, SWITZERLAND, ASSIGNOR TO L. DURAND & HUGUENIN, OF SAME PLACE.

MANUFACTURE OF BLUE COLORING-MATTER.

SPECIFICATION forming part of Letters Patent No. 369,764, dated September 13, 1887.

Application filed November 4, 1886. Serial No. 217,971. (Specimens.) Patented in France September 6, 1886, No. 178,364, and in England November 5, 1886, No. 14,283.

*To all whom it may concern:*

Be it known that I, JOSEPH ANNAHEIM, doctor of philosophy, a citizen of Switzerland, residing at 58 St. Johannvorstadt, Basle, Switzerland, have invented certain new and useful Improvements in the Manufacture of Dyeing-Matter, (for which Letters Patent have been issued in Great Britain, No. 14,283, dated November 5, 1886, and in France, No. 178,364, dated September 6, 1886;) and I do hereby declare the following to be a full, clear, and exact description of the invention, such as will enable others skilled in the art to which it appertains to make and use the same.

The invention relates to the manufacture of coloring-matter; and it consists in a novel process of obtaining reddish-violet to blue coloring-matter by treating the nitroso derivates of the tertiary aromatic amines with the bioxynaphthalines and the products of condensation of the bioxynaphthalines with aniline or one of the homologues of the latter, substantially as hereinafter fully described, and as set forth in the claims.

The invention further consists in a new article of manufacture from which coloring-matter can be obtained, substantially as hereinafter described, and as set forth in the claims.

The formation of the products of condensation of bioxynaphthaline with aniline and its homologues is effected as follows: If a condensing agent is mixed with bioxynaphthaline and a primary aromatic amine, such as aniline, para or ortho toluidine, xylidine, or cumidine, or alpha or beta naphthylamine, &c., and the mixture is heated, water is separated; and when aniline is used the following products are obtained:

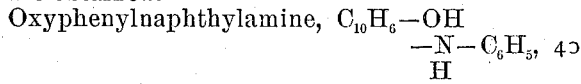

or

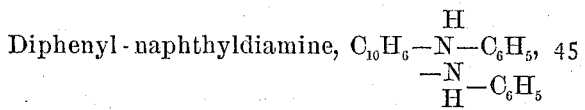

according to the equations—

Bioxynaphthaline, aniline.

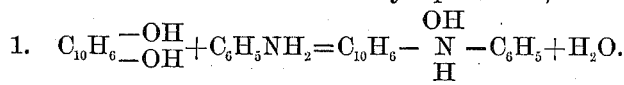

Oxyphenyl-naphthylamine, water.   Bioxynaphthaline, aniline =

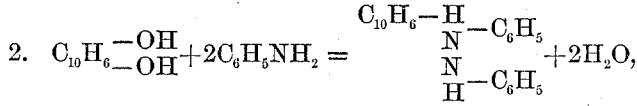

Dyphenyl-naphthyldiamine.

As shown by experiment, it seems that the reaction seems to take place principally according to the second equation, under the conditions hereinafter set forth—that is to say, both the hydroxyl groups are replaced by phenylamide residues or remainders, $C_6H_5NH$.

The following may be used as condensing agents: chloride of calcium, chloride of zinc, and hydrochloric acid, either by themselves or in the form of amine hydrochlorate or chloride of aluminium, &c.

As an example, I will only give the production of the aniline derivates from which the production of the derivates of the homologues of aniline may readily be deduced. I mix sixteen kilograms of bioxynaphthaline (preferably that prepared according to the process of Ebert & Mertz, Reports of the German Society of Chemists, Berichte der Deutschen Chemischen Gesellschaft, volume ix, page 609) with thirty-seven kilograms of aniline and thirteen kilograms of aniline hydrochlorate, and heat the mixture, either in a closed or an open vessel, to the boiling-point of the aniline. When the reaction is completed, the mass is treated in the usual manner to eliminate the aniline therefrom. The product, free from aniline, is then purified and compressed and dried.

As the above-described proportions may be varied and equally good results obtained, I do not desire to limit myself thereto.

The new combination obtained, as described, is a solid white body, insoluble in water, and in the alkalies not readily soluble in cold ethyl, methyl, or amyl alcohol, easily soluble in ether, boiling benzole, toluol, or glacial acetic acid, and by means of these solvents the product may be readily obtained in a chemically pure crystalline form. The melting-point of this product is 163.5° centigrade. The toluidine and xylidine derivates may be obtained with equal facility. When alpha or beta naphthylamine is employed, the reaction takes place under less favorable conditions in that the formation of dinaphthylamine is observable to a disagreeable degree.

The product obtained from paratoluidine is considerably less soluble in the above-named solvents than the aniline derivates, and its melting-point is considerably higher—namely, 237°. From these products of condensation I obtain reddish-violet to blue coloring-matter, according to the combination of chemicals, by either of the following methods:

First, by mixing the products of condensation, preferably in molecular proportion, with the free nitroso combination, or a salt thereof—as, for instance, nitroso-dimethylaniline hydrochlorate—and a suitable solvent, and gradually heating the compound until the complete conversion of the product into coloring-matter has been effected. The following solvents may be employed: a weak alkaline (neutral or acid) aqueous solution, and, if the alkaline solution is an acid one, I preferably employ an acetate; or alcohols, glacial acetic acid, &c., may be employed.

Secondly, by reducing the nitroso combination—for instance, nitroso-dimethylaniline hydrochlorate—with zinc-dust and hydrochloric acid, adding thereto the binoxynaphthaline and oxidizing the mass by the addition of bichromate of potassium or sesquichloride of iron, &c.

Having described my invention, what I claim is—

1. The herein-described process of obtaining products for the manufacture of coloring-matter, which consists in treating a mixture of bioxynaphthaline and aniline, or one of the homologues of the latter, with a condensing agent and freeing the product of condensation from the aniline or its homologues, substantially as described, for the purpose specified.

2. The herein-described new article of manufacture, consisting of the product of condensation of bioxynaphthaline with aniline or one of its homologues, substantially as described.

3. The process of obtaining coloring-matter from the product of condensation of bioxynaphthaline with aniline or one of its homologues, by treating the product directly with nitroso combinations of the tertiary aromatic amines, or by reducing the nitroso combinations and oxidizing the resulting diamine and the product of condensation, substantially as described.

In testimony whereof I affix my signature in presence of two witnesses.

JOSEPH ANNAHEIM.

Witnesses:
JAKOB FRANK,
GEORGE GIFFORD.